(12) United States Patent
Myrah et al.

(10) Patent No.: US 9,336,032 B2
(45) Date of Patent: May 10, 2016

(54) ZONING DATA TO A VIRTUAL MACHINE

(75) Inventors: Michael G. Myrah, Tomball, TX (US); Balaji Natrajan, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 431 days.

(21) Appl. No.: 13/879,805

(22) PCT Filed: Oct. 28, 2010

(86) PCT No.: PCT/US2010/054540
§ 371 (c)(1),
(2), (4) Date: Apr. 17, 2013

(87) PCT Pub. No.: WO2012/057769
PCT Pub. Date: May 3, 2012

(65) Prior Publication Data
US 2013/0219393 A1 Aug. 22, 2013

(51) Int. Cl.
*G06F 9/455* (2006.01)
(52) U.S. Cl.
CPC ........ *G06F 9/45533* (2013.01); *G06F 9/45558* (2013.01); *G06F 2009/45579* (2013.01)
(58) Field of Classification Search
None
See application file for complete search history.

(56) References Cited

U.S. PATENT DOCUMENTS

| 2005/0143079 A1 | 6/2005 | Seto |
| 2006/0095630 A1 | 5/2006 | Bashford |
| 2006/0101171 A1 | 5/2006 | Grieff et al. |
| 2006/0136666 A1 | 6/2006 | Pang et al. |
| 2007/0162592 A1 | 7/2007 | Marks et al. |
| 2009/0007154 A1 | 1/2009 | Jones |
| 2009/0150643 A1* | 6/2009 | Jones et al. .................... 711/203 |
| 2009/0235248 A1 | 9/2009 | Conrad |
| 2010/0088469 A1 | 4/2010 | Motonaga et al. |
| 2010/0095310 A1 | 4/2010 | Oshins |
| 2015/0134854 A1* | 5/2015 | Tchapda ........................... 710/3 |
| 2015/0135177 A1* | 5/2015 | Ganga .............................. 718/1 |

FOREIGN PATENT DOCUMENTS

| JP | 2009098798 | 5/2009 |
| WO | WO-2010030996 | 3/2010 |

OTHER PUBLICATIONS

ISR/WO, PCT/US2010/054540, Jun. 27, 2011, 9 pps.
EP OA2MO, 10859082.9, Aug. 28, 2014, 3 pps.
EP Search Report, Application 10859082.9, Nov. 17, 2014 8 pps.

* cited by examiner

*Primary Examiner* — Ilwoo Park
(74) *Attorney, Agent, or Firm* — Wagner Blecher, LLP

(57) ABSTRACT

In a method to zone data to a virtual machine, support information is exchanged between a physical controller and an expander, the support information comprising an indication of an ability of the physical controller and the expander to support thereon a set of virtual controllers and a set of virtual physical layers (virtual PHYs), respectively. In response to a positive indication sending a list of SAS addresses to the expander, a list of SAS addresses is sent to the expander. Then, a first SAS address of the list of SAS addresses is assigned to a first virtual PHY of the set of virtual PHYs, wherein the assigning is performed by the expander, and wherein the first virtual PHY at an assigned SAS address corresponds to a first virtual controller of the set of virtual controllers.

14 Claims, 5 Drawing Sheets

ZONING DATA TO A VIRTUAL MACHINE

BACKGROUND

In general, a virtual machine is an efficient, isolated duplicate of a real machine. Virtual machines may be separated into two major categories, system virtual machines and process virtual machines. In brief, a system virtual machine provides a complete system platform which support the execution of a complete operating system. A process virtual machine is designed to run a single program, which means that it supports a single process.

System virtual machines allow the sharing of the underlying physical machine resources between different virtual machines, each running its own operating system. The software layer providing the virtualization is called a virtual machine monitor or a hypervisor. The hypervisor can run on bare hardware (native VM) or on top of an operating system (hosted VM), based on their use and degree of correspondence to a real machine. Utilizing a hypervisor enables multiple operating system environments to reside on a single computer.

Figure 1A:
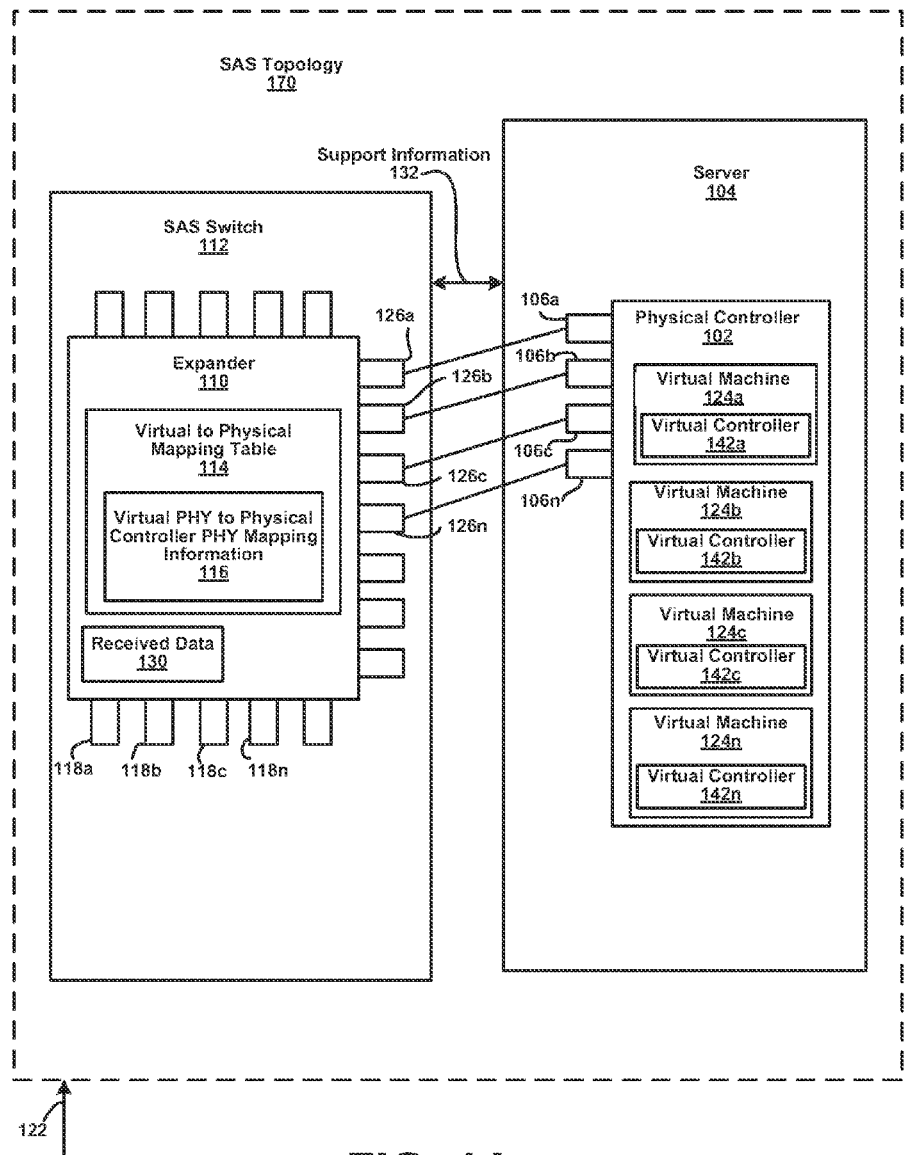
FIG. 1A is a block diagram of a system for zoning data to a virtual machine, according to one embodiment of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "exchanging", "sending", "assigning", "receiving", "coupling", "accessing", "determining", "utilizing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical computers.

The discussion will begin with a brief overview of a single root complex utilizing input/output virtualization SR-IOV and a Serial Attached Small Computer System Interface (SAS) system in relation to zoning hard drives to a virtual machine associated with a SAS topology. The discussion will then focus on embodiments of the present technology that provide a system for zoning data to a virtual machine, within a SAS topology.

Overview

In general, single root topology involves a single computer that supports virtualization technology. SR-IOV is a specification that enables multiple virtual machines running simultaneously within a single computer to natively share one or more devices, such as computer expansion cards (PCIe devices). Through the virtualization technology, a hypervisor, software on or firmware embedded in the computer's hardware platform, manages operating systems on the virtual machines. Thus, for example, SR-IOV in conjunction with a hypervisor, allows a PCIe device to appear as multiple physical PCIe devices utilizing physical functions (PFs) and virtual functions (VFs). SR-IOV may be used in conjunction with SAS.

Briefly, a SAS is a computer bus used to move data to and from computer storage devices, such as hard drives. A SAS generally includes an initiator device, a target device, and a service delivery subsystem.

The initiator device, also referred to as a controller, originates device-service and task-management requests for processing to be performed by a target device. The initiator device receives responses of these same requests from one or more target devices. An initiator device may be an on-board component on a motherboard.

A target device contains logical units and target ports. It receives device-service and task-management requests for processing, and sends responses to these requests to the initiator device. A target device may be a hard drive.

A service delivery subsystem is a part of an input/output system that transmits information between the initiator device and the target device. An expander device forms part of the service delivery subsystem and facilitates communication between devices within the SAS topology. For example, expanders facilitate the connection of multiple end devices in the SAS topology to a port of an initiator device.

Currently, in order to zone a group of hard drives to a virtual machine in a SAS topology, the SR-IOV requires support both in the Basic Input Output System (BIOS) and the Operating System (OS) or the hypervisor. For example, a SR-IOV capable SAS virtual controller presents itself as being multiple VFs, thus appearing to the hypervisor as multiple virtual controllers, one for each VF. In order to zone a group of hard drives to virtual machines, the group of hard drives are first zoned to a PF. Secondly, using host side software such as a hypervisor, a subset of these hard drives are then mapped to a specific VF. The hard drives then appear on the OS that is using that particular VF.

Embodiments of the present technology zone hard drives directly to specific VFs using SAS technology, without the use of host side software or firmware, thereby increasing efficiencies by eliminating a configuration step of the current method. Further, since each virtual controller corresponds to a unique SAS address, SAS switch management software may determine if drives or storage enclosures zoned to virtual controllers can be powered down. For example, according to embodiments of the present technology, if a hypervisor turns off a virtual machine, the SAS switch can determine that the hard drive that has been assigned to the virtual controller on that virtual machine no longer needs to be spun up. The SAS switch will then spin the hard drive down until the virtual machine is powered on again. This power saving technique is applicable to SAS expander devices, SAS expander PHYs, hard drives, and storage enclosures.

The following discussion will begin with a description of the structure of the components of the present technology. The discussion will then be followed by a description of the components in operation.

Structure

Figure 1B:
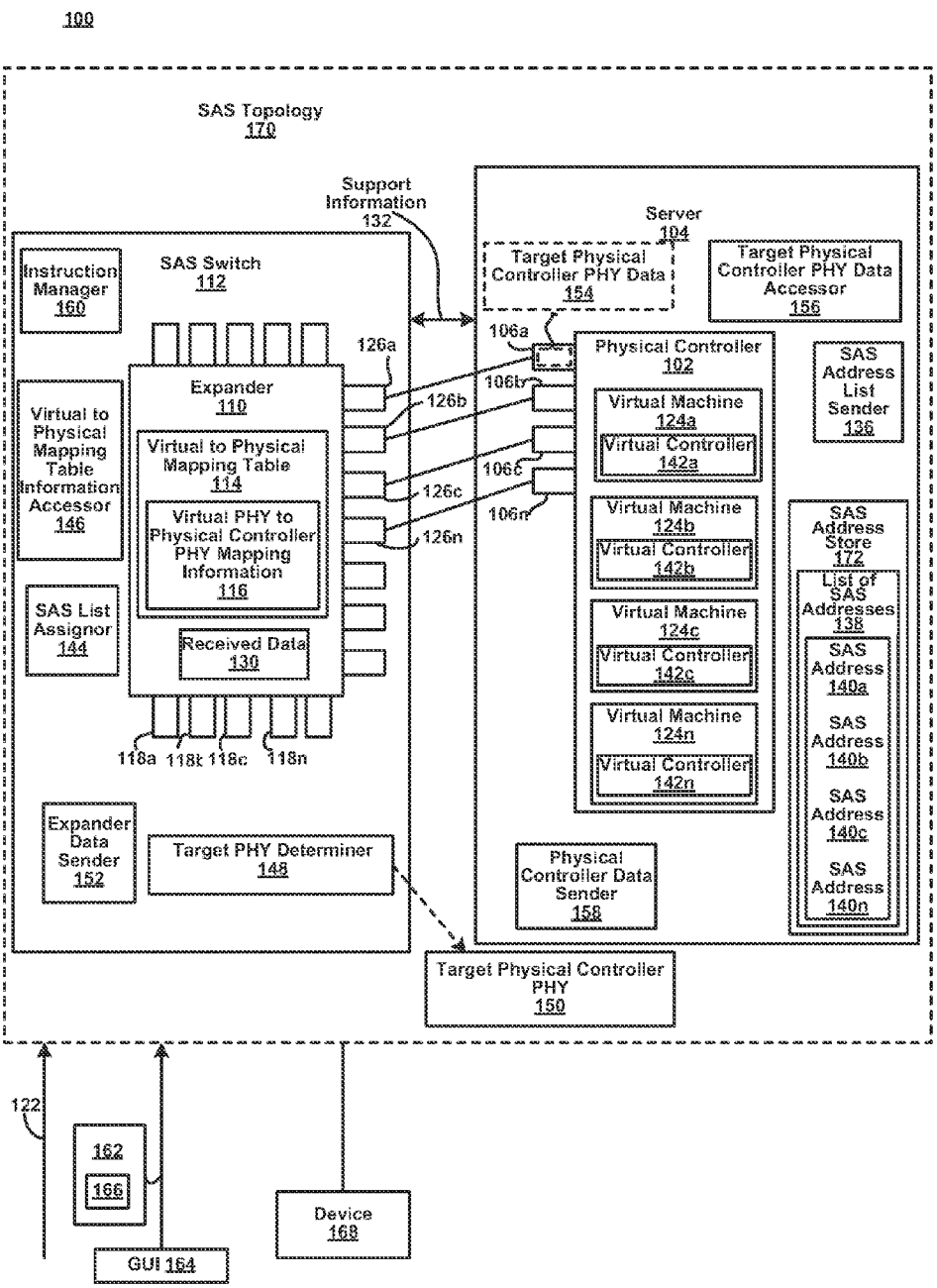
FIG. 1B is a block diagram of a system for zoning data to a virtual machine, according to one embodiment of the present technology.

FIG. 1A is a block diagram of a system for zoning data to a virtual machine, according to one embodiment of the present technology. FIG. 1B is also a block diagram of a system for zoning data to a virtual machine, according to another embodiment of the present technology. Referring now to FIGS. 1A and 1B, in one embodiment, the system 100 includes a physical controller 102, at least one physical controller physical layer (physical controller PHY) 106*a*, 106*b*, 106*c* and 106*n* . . . ), an expander 110 and a set of expander virtual PHYs 118*a*, 118*b*, 118*c* and 118*n* . . . and a set of expander physical layers (expander PHYs) 126*a*, 126*b*, 126*c* and 126*n* . . . both coupled with the expander 110.

In one embodiment, the physical controller 102 is coupled with a server 104. In another embodiment, at least one physical controller PHY 106*a*, 106*b*, 106*c* and 106*n* . . . (hereinafter, at least one physical controller PHY 106) is coupled with the physical controller 102. It should be understood that the system 100 may include anywhere from one physical controller PHY to as many physical controller PHYs (physical controller PHY 106*n* . . . ) that the physical controller 102 may support. For purposes of clarity and brevity hereinafter, when referring to at least one physical controller PHY in general, physical controller PHY 106 will be referenced. At least one physical controller PHY 106 are coupled with the outer edges of physical controller 102.

In one embodiment, system 100 includes an expander 110 coupled with a SAS switch 112 and is further communicatively coupled with the physical controller 102. In one embodiment, the SAS switch is within SAS topology 170. By communicatively coupled, it is meant that the expander 110 is coupled with physical controller 102 in a manner which enables the expander 110 and the physical controller 102 to exchange information.

In one embodiment, the communicative coupling occurs through a physical connection, such as a cable. For example, in one embodiment, the system 100 utilizes 4 physical layer (PHY) lanes per cable. It should be appreciated that more or less PHY lanes per cable may be used and is dependent on the cable's size and ability to enclose the PHY lanes. In another embodiment, the communicative coupling is achieved through wiring. For example, in blade server system, internal wiring within the blade enclosure connects the server 104 and the physical controller 102 coupled therewith with the expander 110.

In one embodiment, the expander 110 includes a virtual to physical mapping table 114. The virtual to physical mapping table 114 includes a virtual physical layer (virtual PHY) to physical controller PHY mapping information 116. The virtual PHY to physical controller PHY mapping information 116 refers to information for routing data from a virtual PHY that is coupled with the expander 110, as will be explained herein, to at least one physical controller PHY 106 coupled with the physical controller 102.

Figure 2:
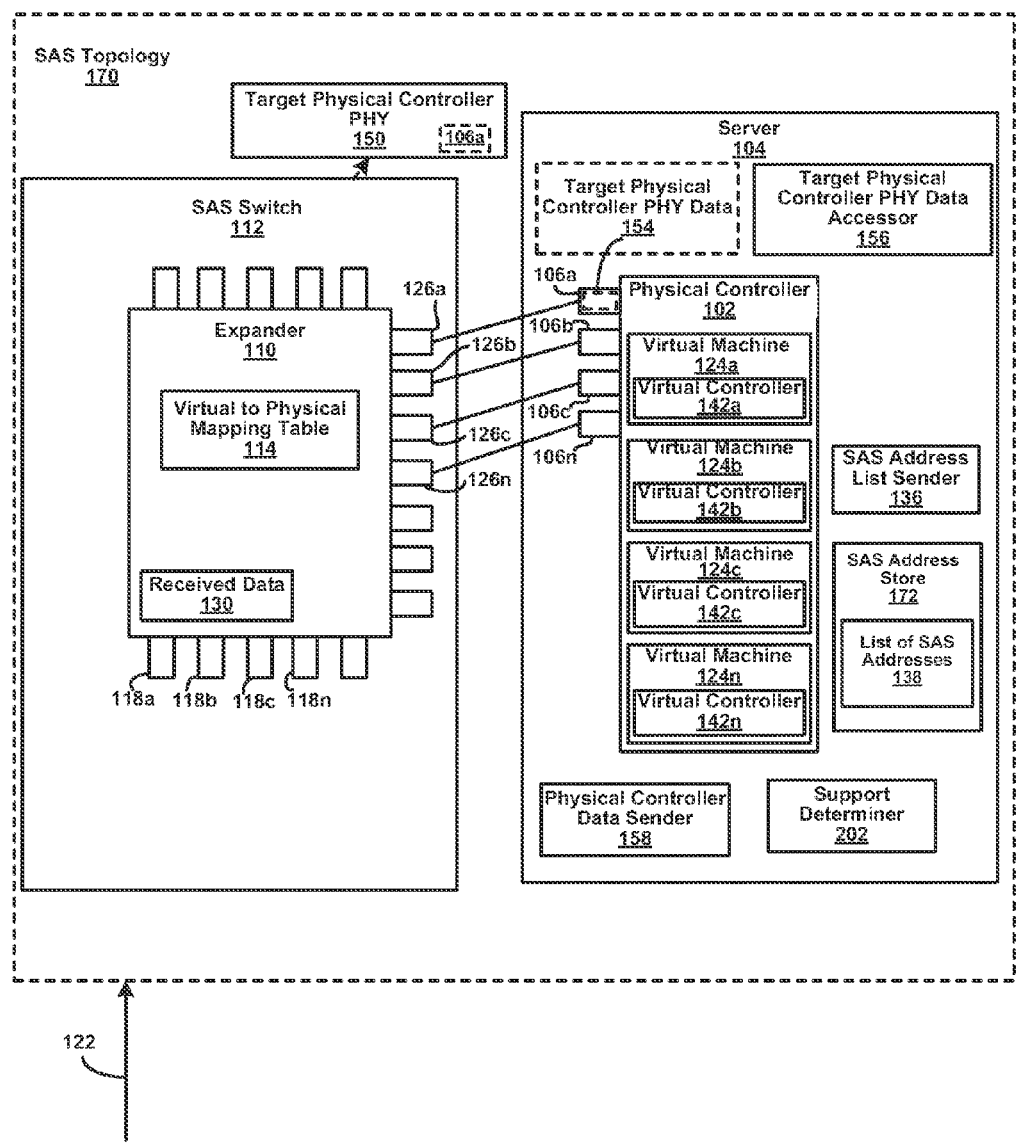
FIG. 2 is a block diagram of a device for zoning a hard drive to a virtual machine, according to one embodiment of the present technology.

In one embodiment, the set of virtual PHYs 118*a*, 118*b*, 118*c* and 118*n* . . . (hereinafter, set of virtual PHYs 118 unless otherwise specified) of system 100 is configured for receiving data 122 to be routed to a first virtual machine 124*a*. It should be understood that the set of virtual PHYs 118 may include just one virtual PHY or any amount of virtual PHYs greater than one that may be physically supported by the expander 110. In one embodiment, the set of virtual PHYs 118 are coupled with the outer edges of the expander 110. It should be appreciated that data 122 from more than one virtual PHY of the set of virtual PHYs 118 may be routed to the same physical controller PHY of the at least one physical controller PHY 106. Additionally, while the virtual machine 124*a* is shown in FIGS. 1A, 1B and 2 and residing on physical controller 102, it should be understood that a portion of the group of virtual machines 124*a*, 124*b*, 124*c* and 124*n* may reside separately from the physical controller 102 and coupled therewith.

In one embodiment and as will be explained herein in the Operation section below, the data 122 causes a storage drive to be communicatively coupled with a virtual PHY of the set of virtual PHYs 118. The data 122 may be instructions to zone a device 168 such as, but not limited to, a particular storage enclosure, to a server 104 and/or a particular physical controller on that server 104.

In one embodiment, the set of expander PHYs 126*a*, 126*b*, 126*c* and 126*n* . . . (hereinafter expander PHYs 126 unless otherwise specified) are coupled with the expander 110. It should be understood that the set of expander PHYs 126 may include just one expander PHY or any amount of expander PHYs greater than one that may be physically supported by the expander 110. In one embodiment, the set of expander PHYs 126 is configured for relaying the received data 130 to a physical controller PHY of the at least one physical controller PHY 106. In one embodiment, the physical controller 102 and the expander 110 are configured for exchanging support information 132. The support information 132 includes an indication of an ability of the physical controller 102 and the expander 110 to support thereon a set of virtual controllers 124 and the set of virtual PHYs 118, respectively. In one embodiment, the physical controller 102 queries the expander 110 if the expander 110 is enabled to support a set of virtual PHYs 118. In another embodiment, the expander 110 queries the physical controller 102 if the physical controller 102 is enabled to support a set of virtual controllers 124. It should be understood that the set of virtual controllers 124 may include one or more than one virtual controllers. Further, it should be appreciated that more than one physical controller 102 may be coupled with server 104, having thereon physical controller PHYs.

In one embodiment, the system 100 further includes a SAS address list sender 136 and a SAS address list assigner 144. In one embodiment, the SAS address list sender 136 is coupled with the physical controller 102. In one embodiment, the SAS address list sender 136 is configured for sending to the expander 110 a list of SAS addresses 138 that includes SAS addresses 140*a*, 140*h*, 140*c* and 140*n* . . . (hereinafter, SAS addresses 140 unless otherwise specified). Each SAS address of the list of SAS addresses 138 represents a virtual controller of a set of virtual controllers 142. Further, the list of SAS addresses 138, in one embodiment, may be found in SAS address store 172. The set of virtual controllers 142 includes virtual controllers 142*a*, 142*b*, 142*c* and 142*n* . . . . It should be understood that the set of virtual controllers 142 may include any number of virtual controllers greater than one that is capable of being supported by system 100 and its components. Furthermore, as shown in FIGS. 1A and 1B, as well as FIG. 2 to be described herein, four virtual machines are shown, virtual machines 124*a*, 124*b*, 124*c* and 124*n* . . . . It should be understood that any number of virtual machines greater than one that is capable of being supported by system 100 and its components may be present in system 100. Furthermore, virtual machines 124*a*, 124*b*, 124*c* and 124*n* may be represented herein as a set of virtual machines 124.

While the set of virtual machines 124 is shown in FIGS. 1A and 1B as being part of the physical controller 102, and the set of virtual controllers 142 is shown as being part of the set of virtual machines 124, it should be noted that the set of virtual machines 124 may be outside the physical controller 102, but associated with a virtual controller of the set of virtual controllers 142 that may be part of the physical controller 102.

In another embodiment, the SAS address list assigner 144 is coupled with the expander 110. The SAS address list assigner 144 is configured for assigning a first SAS address 140*a* of the list of SAS addresses 138 to a first virtual PHY 118*a* of the set of virtual PHYs 118. The first virtual PHY 118*a* at the assigned SAS address 140*a* represents an expander PHY of the set of expander PHYs 126 as being connected to a virtual controller of the set of virtual controllers 142. It should be understood that any one of the set of virtual PHYs 118, set of virtual controllers 142 and virtual machines 124 may be designated as the "first" virtual PHY, virtual controller and virtual machine, respectively.

In one embodiment, system 100 further includes a virtual to physical mapping table information accessor 146 and a target PHY determiner 148. In one embodiment, the virtual to physical mapping table information accessor 146 is coupled with the expander 110. The virtual to physical mapping table information accessor 146 is configured for accessing the virtual PHY to physical controller PHY mapping information 116.

In one embodiment, the target PHY determiner 148 is coupled with the virtual to physical mapping table information accessor 146. In one embodiment, the target PHY determiner 148 is configured for determining a target physical controller PHY 150 of the at least one physical controller PHY 106 to which to send the received data 130 based on the virtual PHY to physical controller PHY mapping information 116. For example and as is explained herein in the Operation section, the virtual PHY to physical controller PHY mapping information 116 provides information as to which physical controller PHY to which to route the received data 130.

In one embodiment, the system 100 further includes an expander data sender 152 that is coupled with the expander 110. The expander data sender 152, in one embodiment, is configured for sending the received data 130 to the target physical controller PHY 150. The target physical controller PHY 150 may be any one of the at least one physical controller PHYs 106. Once the received data 130 is sent to the target physical controller PHY 150 as designated, the received data 130 becomes "target physical controller PHY data" 154. For example, the target physical controller PHY 150 may be determined to be physical controller PHY 106*a*.

Embodiments of the present technology further include a target physical controller PHY accessor 156 and a physical controller data sender 158. In one embodiment, the target physical controller PHY accessor 156 is coupled with the physical controller 102. The target physical controller PHY accessor 156 is configured for accessing the target physical controller PHY data 154 at the target physical controller PHY, such as target physical controller PHY 106*a*.

In one embodiment, the system 100 further includes an instruction manager 160 that is coupled with the expander 110. In one embodiment, the instruction manager 160 is configured for receiving an expander zoning instruction 162 via a graphical user interface 164. The expander zoning instruction 162, in one embodiment, is received at the expander 110. The expander zoning instruction 162 comprises at least one virtual PHY to a virtual controller mapping direction 166.

FIG. 2 shows a block diagram of a device 200 for zoning a hard drive to a virtual machine, in accordance with embodiments of the present technology. Referring now to FIGS. 1A, 1B and 2, in one embodiment, the device 200 includes a physical controller 102 and at least one physical controller PHY 106. In one embodiment, the physical controller 102 is coupled with a server 104.

In one embodiment, the physical controller 102 includes a support determiner 202 and an SAS address list sender 136. In one embodiment, the support determiner 202 is configured for communicating with an expander 110 that is coupled with a SAS switch 112. The communicating includes determining if the expander 110 is enabled to support a set of virtual PHYs 118 thereon, as is explained herein.

In one embodiment, the SAS address list sender 136 is configured for sending a list of SAS addresses 138 to the expander 110 if the expander 110 is determined to be enabled to support a set of virtual PHYs 118 thereon. In one embodiment, each SAS address 140*a*, 140*b*, 140*c* and 140*n* . . . of the list of SAS addresses 138 represents a virtual controller, such as virtual controller 142*a*.

In another embodiment, the physical controller 102 further includes a target physical controller PHY accessor 156 and a physical controller data sender 158. In one embodiment, the target physical controller PHY accessor 156 is configured for accessing the target physical controller PHY data 154 at the target physical controller PHY 150.

In another embodiment, the physical controller data sender 158 is configured for sending to a virtual controller, such as virtual controller 142*a*, the target physical controller PHY data 154.

In one embodiment, at least one physical controller PHY 106 is coupled with the physical controller 102. In one embodiment, the at least one physical controller PHY 106 is configured for enabling communication with the expander 110. The communication includes the sending of the list of SAS addresses 138 and the receiving of target physical controller PHY data 154 at the target physical controller PHY 150.

Thus, embodiments of the present technology expose a virtual controller to an SAS topology, thereby enabling the direct assignation of hard drives to the virtual machine associated with the virtual controller. For example, embodiments do not follow the current method of utilizing host firmware to zone SAS storage; the controller and the expander firmware on the SAS switch are employed. Thus, embodiments provide for a more direct and efficient system for zoning a hard drive to a virtual machine.

Operation

In embodiments of the present technology, an expander publishes virtual controllers as being connected with virtual PHYs. In this manner, embodiments provide a method for directly zoning data to a virtual machine without utilizing host firmware.

Figure 3:
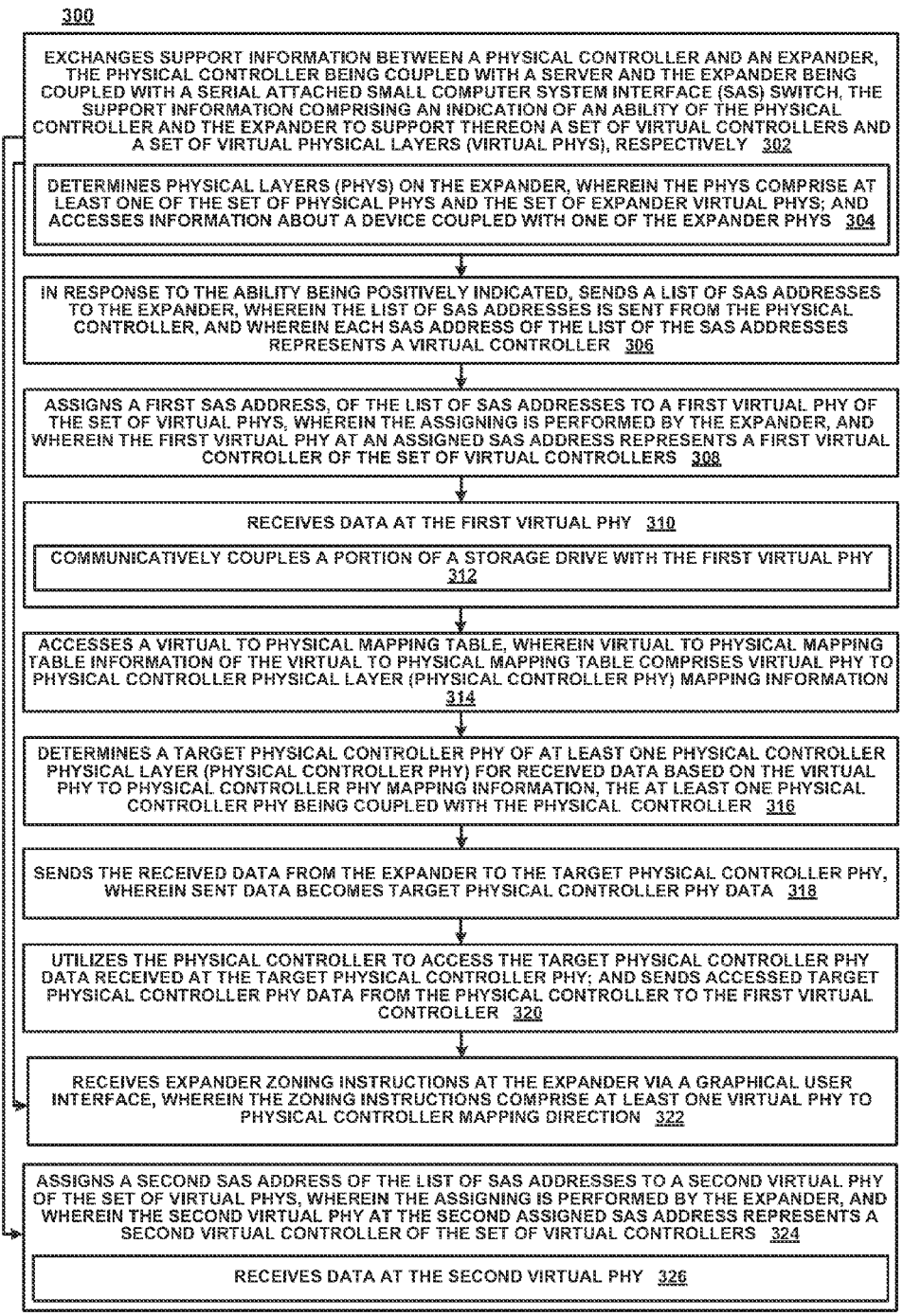
FIG. 3 is a flow diagram of a method for zoning data to a virtual machine, according to one embodiment of the present technology.

FIG. 3 is a flow diagram of a method 300. In one embodiment, method 300 is embodied in instructions, stored on a non-transitory computer-readable storage medium, which when executed by a computer system (see 400 of FIG. 4), cause the computer system to perform the method 300 for zoning data to a virtual machine. The method 300 is described below with reference to both FIGS. 1A, 1B, 2 and 3.

At 302, in one embodiment and as described herein, the method 300 includes instructions for exchanging support information 132 between a physical controller 102 and an expander 110, the physical controller 102 being coupled with a server 104 and the expander 110 being coupled with a SAS switch 112. In one embodiment, the support information 132 comprises an indication of an ability of the physical controller 102 and the expander 110 to support thereon a set of virtual controllers 124 and a set of virtual PHYs 118, respectively.

At 304, in one embodiment, the exchanging at 302 includes determining expander PHYs on the expander 110, wherein the expander PHYs comprise at least one of a set of expander physical PHYs and a set of virtual PHYs 118. Additionally, at 304, the exchanging at 302 further includes accessing information about a device 168 that is coupled with one of the expander PHYs.

For example and as is known in the art, the physical controller 102 tries to determine what devices are present in the SAS topology. In order to determine this, the physical controller 102 will communicate with the expander 110 and discover everything that is attached to the expander 110, whether it be another expander and/or a device, such as, but not limited to, storage enclosures. As described herein, a set of virtual PHYs 118 are coupled with the expander 110. From the perspective of the physical controller 102, the set of virtual PHYs 118 looks exactly like the set of expander physical PHYs. The physical controller 102 queries all of the PHYs, the expander physical PHYs and the set of virtual PHYs 118 to determine what if any devices are attached to the expander PHYs. The expander PHYs will respond to the physical controller 102 by describing what devices are attached thereto.

In embodiments of the present technology, the physical controller 102 sends commands to the expander 110 to determine whether or not the expander supports a set of virtual PHYs 118. The content of these commands may be vendor specific and/or customized for the user/owner. In one embodiment, a set of virtual controllers 124 is coupled with the set of virtual PHYs 118. Thus, the set of virtual PHYs 118 may describe a set of virtual controllers 124 attached thereto. From the perspective of the physical controller 102, the set of virtual controllers 124 appears to be a set of physical controllers. Thus, if the physical controller 102 discovers a device, such as device 168 (which may be SAS storage), that is attached to the set of virtual PHYs 118, the physical controller 102 then opens a connection to the device 168 so that communication between the device 168 and the physical controller 102 is possible. As will be described herein, the physical controller 102 then may direct the device 168 to be zoned to one of a set of virtual controllers 124 on a virtual machine.

At 306, the method 300 includes instructions for, in response to the ability at 302 being positively indicated, sending a list of SAS addresses 138 to the expander 110, wherein the list of SAS addresses 138 is sent from the physical controller 102. Furthermore, in one embodiment, each SAS address of the list of SAS addresses 138 represents a virtual controller 124. In other words, the physical controller 102 provides a list of SAS addresses 138 that the physical controller 102 wants to use to represent the set of virtual controllers 124. The expander 110 receives this list of SAS addresses 138. For each virtual PHY of the set of virtual PHYs 118, the expander 110 will appoint one SAS address of the list of SAS addresses 138 to that virtual PHY. Accordingly, each virtual PHY with an appointed SAS address looks like a physical controller, while being associated with a set of virtual controllers 124. The expander 110 receives the SAS addresses for the set of virtual controllers 124 and uses these SAS addresses to set up the set of virtual PHYs 118 to appear as a set of virtual controllers 124.

At 308, the method 300 includes instructions for assigning a first SAS address, such as 140a, of the list of SAS addresses 138 to a first virtual PHY 118a of the set of virtual PHYs 118. The assigning 308 is performed by the expander 110. The first virtual PHY 118a at the assigned SAS address 140a represents a first virtual controller 142a of the set of virtual controllers 124.

At 310, in one embodiment the method 300 further includes instructions for receiving data at the first virtual PHY, such as virtual PHY 118a. At 312, in another embodiment the receiving data at 308 includes communicatively coupling a storage drive with the first virtual PHY, such as virtual PHY 118a. By communicatively coupling at 308, it is meant that a storage drive is coupled via cable (utilizing PHY lanes) and/or internal wiring (within a blade enclosure) with a first virtual PHY.

At 314, in one embodiment and as described herein, the method 300 further includes instructions for accessing a virtual to physical mapping table 114, wherein virtual to physical mapping table information of the virtual to physical mapping table 114 includes virtual PHY to physical controller PHY mapping information 116.

At 316, in one embodiment and as described herein the method 300 further includes instructions for determining a target physical controller PHY 150 of the at least one physical controller PHY 106 for the received data 130 based on the virtual PHY to physical controller PHY mapping information 116, wherein the at least one physical controller PHY 106 is coupled with the physical controller 102.

At 318, in one embodiment and as described herein, the method further includes instructions for sending the received data 130 from the expander 110 to the target physical controller PHY 150.

At 320, in one embodiment and as described herein, the method further includes instructions for utilizing the physical controller 102 to access target physical controller PHY data 154 received at the target physical controller PHY 150. Further, at 320, the physical controller 102 sends the accessed target physical controller PHY data 154 to the first virtual controller, such as virtual controller 142a.

At 322, in one embodiment and as described herein, the method further includes instructions for receiving expander zoning instructions 162 via a graphical user interface 164, wherein the expander zoning instructions 162 includes at least one virtual PHY to physical controller mapping direction 166. In another embodiment, the expander zoning instructions 162 may be any instruction associated with zoning a device 168, such as but not limited to, hard drives.

At 324, in one embodiment the method 300 further includes instructions for assigning a second SAS address, such as SAS address 140b, to a second virtual PHY 118b of the set of virtual PHYs 118, wherein the assigning is performed by the expander 110. Additionally, the second virtual PHY 118b at that second assigned SAS address 140b represents a second virtual controller 142b of the set of virtual controllers 124. Further, at 326, in one embodiment, the method 300 at 324 further includes receiving data at the second virtual PHY 118b. For example, this data may be instructions for coupling a hard drive to a virtual controller, and therefore a virtual machine.

Thus, in one embodiment, any outgoing request from a virtual controller 142 is sent directly to the storage device (e.g., hard drive). While, any incoming response form the storage device is intercepted by the expander 110 and redirected to the physical controller Phys 106 using the virtual to physical mapping table 116.

Currently, there is no standard way of assigning SAS storage directly to virtual machines in a way that only affects the physical controller and SAS switch expander firmware. Embodiments of the present technology provide a method for directly zoning SAS storage to a virtual machine which reduces host firmware involvement and thereby increases the overall efficiency of zoning. Furthermore, embodiments provide a method for more efficient power management.

Example Computer System Environment

Figure 4:
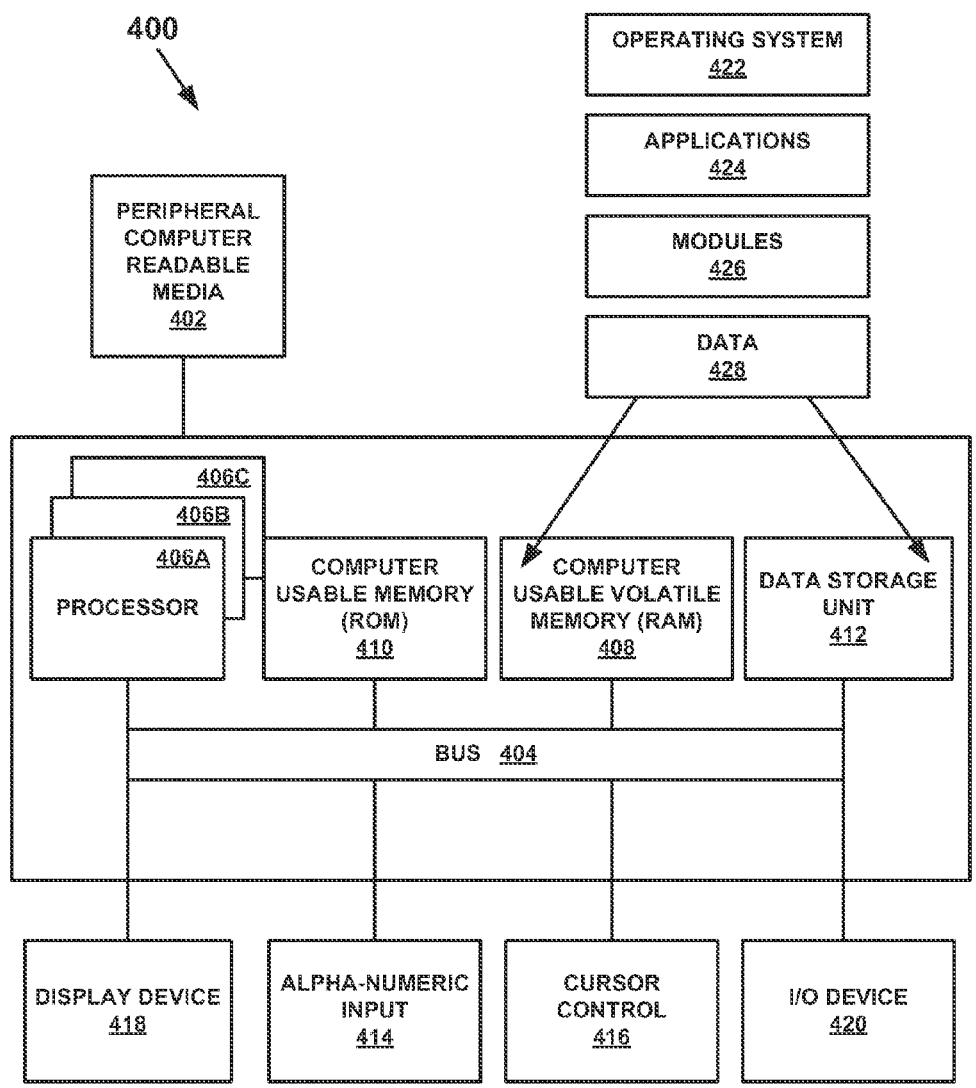
FIG. 4 is a diagram of an example computer system used for zoning data to a virtual machine, according to one embodiment of the present technology.

With reference now to FIG. 4, portions of the technology for performing a method for zoning data to a virtual machine are composed of computer-readable and computer-executable instructions that reside, for example, in computer-readable storage media of a computer system. That is, FIG. 4 illustrates one example of a type of computer that can be used to implement embodiments, which are discussed below, of the present technology.

FIG. 4 illustrates an example compute system 400 used in accordance with embodiments of the present technology. It is appreciated that system 400 of FIG. 4 is an example only and that the present technology can operate on or within a number of different computer systems including general purpose networked computer systems, embedded computer systems, routers, switches, server devices, user devices, various intermediate devices/artifacts, stand alone computer systems, and the like. As shown in FIG. 4, computer system 400 of FIG. 4 is well adapted to having peripheral computer readable media 402 such as, for example, a floppy disk, a compact disc, and the like coupled thereto.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alphanumeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alphanumeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alphanumeric input device 414 using special keys and key sequence commands.

System 400 is also well suited to having a cursor directed by other means such as, for example, voice commands. System 400 also includes an I/O device 420 for coupling system 400 with external entities. For example, in one embodiment, I/O device 420 is a modern for enabling wired or wireless communications between system 400 and an external network such as, but not limited to, the Internet. A more detailed discussion of the present technology is found below.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. The present technology may be applied to one or more elements of described system 400. For example, a method for identifying a device associated with a transfer of content may be applied to operating system 422, applications 424, modules 426, and/or data 428.

The computing system 400 is only one example of a suitable computing environment and is not intended to suggest any limitation as to the scope of use or functionality of the present technology. Neither should the computing environment 400 be interpreted as having any dependency or requirement relating to any one or combination of components illustrated in the example computing system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What we claim is:

1. A non-transitory computer-readable storage medium comprising instructions stored thereon which, when executed by a computer system, cause said computer system to:
exchange support information between a physical controller and an expander, said physical controller being coupled with a server and said expander being coupled with a Serial Attached Small Computer System Interface (SAS) switch, said support information comprising an indication of an ability of said physical controller to support thereon a set of virtual controllers and an indication of an ability of said expander to support thereon a set of virtual PHYs;
in response to the indication of said ability of said expander to support thereon the set of virtual PHYs, send a list of SAS addresses to said expander from said physical controller, said SAS addresses of said list of SAS addresses representing virtual controllers of said set of virtual controllers;
receive zoning instructions at said expander via a graphical user interface, said zoning instructions comprising at least one virtual PHY to physical controller mapping direction; and
assign a first SAS address of said list of SAS addresses to a first virtual PHY of said set of virtual PHYs by said expander based upon said zoning instructions, said first virtual PHY at an assigned SAS address corresponding to a first virtual controller of said set of virtual controllers.

2. The non-transitory computer-readable storage medium of claim 1, further comprising instructions for:
receiving data at said first virtual PHY.

3. The non-transitory computer-readable storage medium of claim 2, wherein said instructions for receiving said data at said first virtual PHY comprises instructions for:
coupling a storage drive with said first virtual PHY.

4. The non-transitory computer-readable storage medium of claim 1, further comprising instructions for:
accessing a virtual to physical mapping table having virtual to physical mapping table information comprising virtual PHY to physical controller PHY mapping information.

5. The non-transitory computer-readable storage medium of claim 4, further comprising instructions for:
determining a target physical controller PHY of at least one physical controller PHY for received data based on said virtual PHY to physical controller PHY mapping information, said at least one physical controller PHY being coupled with said physical controller.

6. The non-transitory computer-readable storage medium of claim 5, further comprising instructions for:
sending said received data from said expander to said target physical controller PHY, said received data becoming target physical controller PHY data.

7. The non-transitory computer-readable storage medium of claim 6, further comprising instructions for:
utilizing said physical controller to access said target physical controller PHY data received at said target physical controller PHY; and
sending said target physical controller PHY data from said physical controller to said first virtual controller.

8. The non-transitory computer-readable storage medium of claim 1, further comprising instructions for:
assigning a second SAS address of said list of SAS addresses to a second virtual PHY of said set of virtual PHYs by said expander, said second virtual PHY at second assigned SAS address representing a second virtual controller of said set of virtual controllers.

9. The non-transitory computer-readable storage medium of claim 8, further comprising instructions for:
receiving data at said second virtual PHY.

10. The non-transitory computer-readable storage medium of claim 1, wherein said instructions to exchange support information between a physical controller and an expander, comprise instructions to:
determine expander PHYs on said expander, said expander PHYs comprising at least one of a set of expander physical PHYs and said set of virtual PHYs; and
access information about a device coupled with one of said expander PHYs.

11. A system comprising:
a physical controller coupled with a server;
at least one physical controller PHY coupled with said physical controller;
an expander coupled with a Serial Attached Small Computer System Interface (SAS) switch and further coupled with said physical controller, said expander comprising:
a virtual to physical mapping table comprising virtual PHY to physical controller PHY mapping information, said virtual to physical mapping table based upon zoning instructions for said expander from a graphical user interface, said zoning instructions comprising at least one virtual PHY to physical controller mapping direction; and
a set of virtual PHYs configured to receive data to be routed to a first virtual machine; and
a set of expander PHYs coupled with said expander and to relay the data to a physical controller PHY of said at least one physical controller PHY, said physical controller and said expander to exchange support information, said support information comprising an indication of an ability of said physical controller to support thereon a set of virtual controllers and an indication of an ability of said expander to support thereon said set of virtual PHYs.

12. The system of claim 11, further comprising:
a SAS address list sender coupled with said physical controller to send to said expander a list of SAS addresses, said SAS addresses of said list of SAS addresses representing virtual controllers of said set of virtual controllers; and
a SAS address list assignor coupled with said expander to assign a first SAS address of said list of SAS addresses to a first virtual PHY of said set of virtual PHYs, said first virtual PHY at said first SAS address corresponding to a first virtual controller of said set of virtual controllers on said first virtual machine.

13. The system of claim 12, further comprising:
a virtual to physical mapping table information accessor coupled with said expander to access said virtual PHY to physical controller PHY mapping information; and
a target PHY determiner coupled with said virtual to physical mapping table information accessor to determine a target physical controller PHY of said at least one physical controller PHY to which to send said received data based on said virtual PHY to physical controller PHY mapping information.

14. A device, comprising:
a physical controller coupled with a server, said physical controller comprising:
   a support determiner to communicate with an expander that is coupled with a Serial Attached Small Computer System Interface (SAS) switch to determine if said expander is enabled to support a set of virtual PHYs thereon; and
   a SAS address list sender to send a list of SAS addresses to said expander when said expander is determined to be enabled to support the set of virtual PHYs thereon, said SAS addresses of said list of SAS addresses representing virtual controllers; and
at least one physical controller PHY coupled with said physical controller to enable communication with said expander, said communication comprising said sending said list of SAS addresses and receiving target physical controller PHY data at a target physical controller PHY, said receiving said target physical controller PHY data at the target physical controller PHY based upon zoning instructions for the expander from a graphical user interface, said zoning instructions comprising at least one virtual PHY to physical controller mapping direction.

* * * * *